United States Patent Office 3,316,831
Patented May 2, 1967

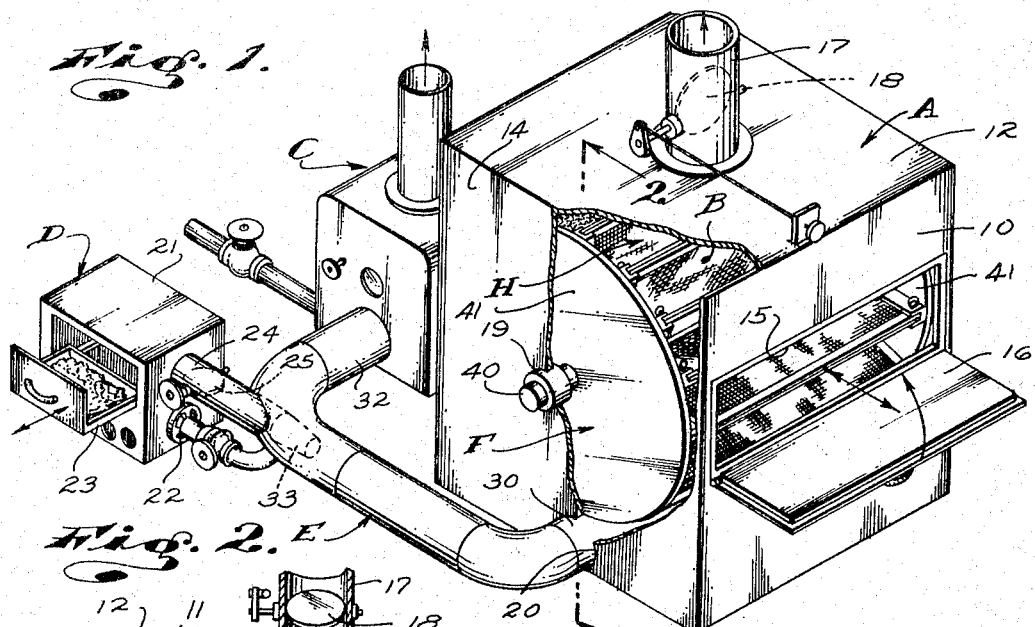
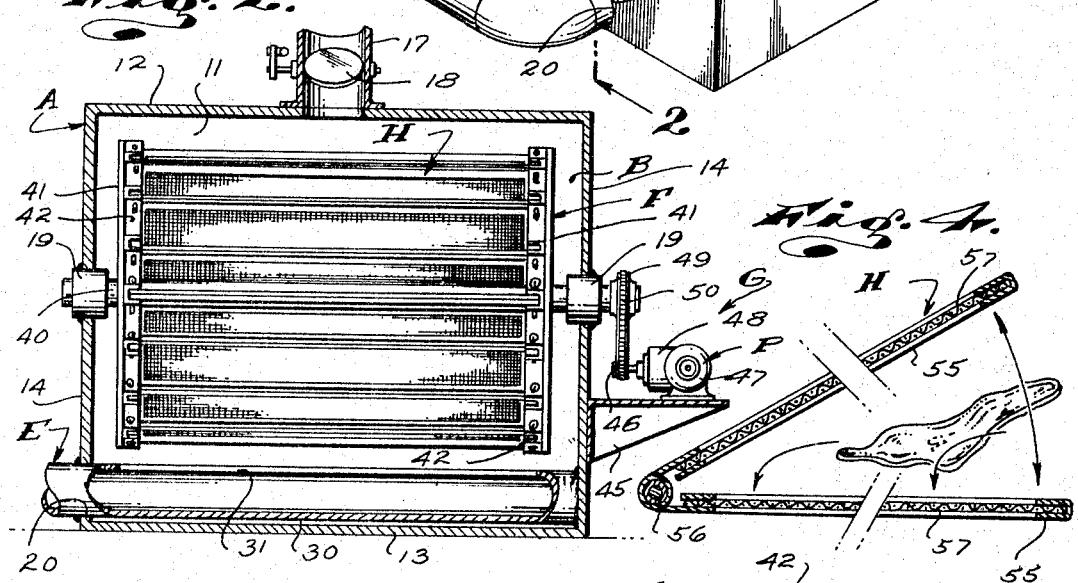
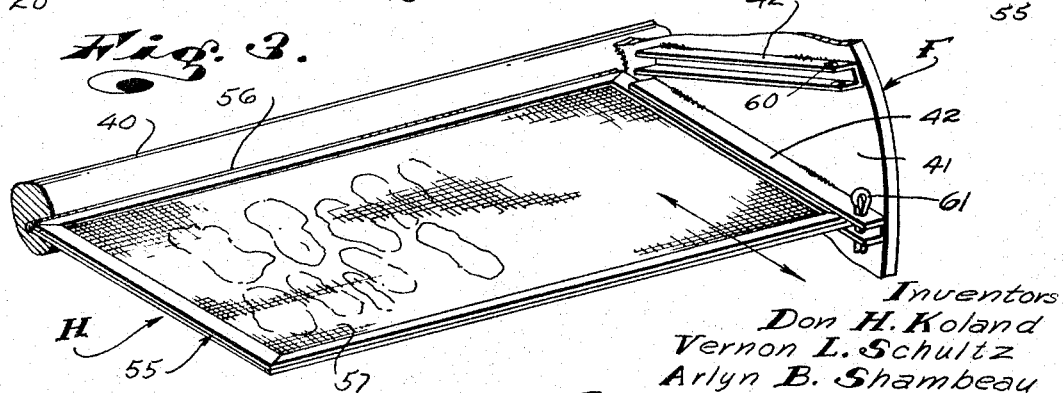

3,316,831
SMOKE-HOUSE
Don H. Koland, Garden Grove, Vernon L. Schultz, Cypress, and Arlyn B. Shambeau, Santa Ana, Calif., assignors to Robert S. Bardins, Newport Beach, Calif.
Filed Feb. 11, 1966, Ser. No. 526,793
10 Claims. (Cl. 99—261)

This invention relates to a smoke-house and is more particularly concerned with an improved smoke-house construction having novel rotary product handling means.

The art of processing foodstuff, particularly meat, by means of smoking, that is, subjecting it to a relatively low, drying heat, for a prolonged period of time and in the presence of smoke, is extremely old and widely practiced.

Prior to smoking meat the meat is usually pre-cured in a suitable marinade brine, subsequent to which the meat is placed in a smoke-house and subjected to heat and smoke for a predetermined period of time.

The purpose of smoking the meat is to finish curing the meat, by drying it to a predetermined extent and to flavor it with the volatile oils and the like which are released through combustion by certain wood and vegetable substances, such as hickory wood.

It is not desirable that the temperature be so high as to cook the meat, in the sense that its fats and volatiles are rendered from it. It is only desired that the temperature be sufficiently high to dry the meat to a predetermined extent and to subject it to sufficient heat for a sufficient period of time to kill all bacteria action.

Since bacteria will not survive in temperatures in excess of 135° F., many smoking operations are carried out at temperatures slightly above 135° F., say, for example, 140° F. The meats are subjected to this heat for a sufficient period of time to assure effective and total killing of all bacteria action and then for a sufficient additional time period to dry the meat to the desired extent and to impart into it the desired smoke flavor.

The principal shortcomings found in smoke-house constructions provided by the prior art reside in the poor or un-uniform distribution of heat and smoke; their limited capacity for production and the necessity or required excessive, awkward and inconvenient shifting and manipulation of the racks and the like which carry the meat.

An object of our invention is to provide a novel smoke-house construction which is such that the foodstuff or meat being smoked is subjected to uniform heat and smoke.

Still another object of the present invention is to provide a smoke-house construction which is such that a substantially greater quantity of meat can be handled than is possible in a conventional smoke-house construction.

Yet another object of this invention is to provide a smoke-house having a plurality of meat racks, each involving a pair of perforate sheet metal or metal fabric planar panels between which the meat is arranged and supported.

Another object is to provide a structure of the character referred to wherein the plurality of racks are slidably engaged between radially outwardly projecting channels or rails on a star wheel type rotor within the smoke-house.

Another object of this invention is to provide a smoke-house of the general character referred to having novel heat and smoke generating means.

The various objects and features of our invention will be fully understood from the following detailed description of a typical embodiment of our invention, throughout which description reference is made to the accompanying drawings, in which:

FIG. 1 is an isometric view of a smoke-house embodying the present invention, portions being broken away to illustrate details of the construction;

FIG. 2 is a sectional view taken as indicated by line 2—2 on FIG. 1;

FIG. 3 is an isometric view of a portion of our new construction; and,

FIG. 4 is a sectional view of a rack structure that we provide.

The smoke-house is shown as including a housing or cabinet A defining a chamber B, heat generating means C, smoke generating means D, heat and smoke distributing means E, a rotor F within the chamber, drive means for the rotor and a plurality of meat racks H.

The cabinet A is a simple box-like cabinet having front and rear walls 10 and 11, top and bottom walls 12 and 13, and side walls 14. The several walls are suitably insulated and can, in practice, be established with inside and outside sheet metal skins and a portion or core of insulating material, such as fiberglass (not shown).

The front wall 10 is provided with an elongate, laterally extending access opening 15 and a hinged closure or door 16. The access opening is substantially coextensive with the lateral extent of the cabinet and is located substantially midway between the top and bottom limits of the cabinet.

The top wall 12 of the cabinet is provided with an exhaust stack 17, which stack is provided with a damper 18.

The side walls 14 are provided with a pair of axially aligned bearings 19 for the rotor F.

One side wall is provided with an opening 20 to accommodate a part or portion of the distributor means E.

The heat generating means C is a simple, conventional gas-burning forced air type furnace, which furnace is arranged at a suitable station remote from the cabinet.

Since the heat generating means can, in practice, vary widely in form and construction, without affecting the novelty of this invention, detailed illustration and description of said heat generating means will be dispensed with.

The smoke generating means D can be of any suitable design. In the case illustrated, the means D is shown as including fire box 21, with a gas burner means 22 within the lower portion thereof. The means D further includes a sawdust tray 23 in the central portion of the firebox and an outlet duct 24 communicating with the upper portion of the box.

The sawdust tray 23 is shown as being in the form of a drawer-like unit and is adapted to carry or support a deposit of sawdust and/or wood chips, such as hickory sawdust or chips. The sawdust is ignited to smoulder and generate smoke. Ignition of the sawdust can be initiated and maintained by means of the burner means 22.

The outlet duct 24 is a short length of metal duct and is provided with a damper 25 to control the rate of flow of smoke from within the fire box.

The heat and smoke distributing means E that we provide includes an elongate distributing duct or tube 30 extending transverse the interior of the chamber B in the cabinet A. The duct or tube 30 extends across the central portion of the cabinet and adjacent the bottom thereof.

The duct 30 has one end projecting through the opening 20 in the side wall of the housing A and is provided with a slot-like discharge opening 31 extending longitudinally thereof to distribute heat and smoke uniformly across the lateral extent of the cabinet and chamber defined thereby.

The means E further includes a delivery duct 32 extending between and connecting the furnace or heat generating means C and the duct 30.

The means E also includes a nozzle 33 of lesser diameter than the duct 32, which nozzle enters the duct 32 at a desired point intermediate the ends thereof and has its discharge end disposed in the direction of flow through said duct 32. The nozzle 33 is connected with the outlet duct 24 of the smoke generating means D.

It will be apparent that the nozzle 33 and duct 32 cooperate to define and establish draft-inducing means which serves to draw smoke from the means D into the duct 32 for delivery into the cabinet A.

The rotor F that we provide is shown as including a central, longitudinal shaft 40 extending laterally through and rotatably supported by the bearings 19 and the side walls 14 of the cabinet. The rotor F further includes a pair of plates or discs fixed to the shaft to occur in axial spaced relationship with each other and to occur adjacent the opposite side walls of the cabinet.

Finally, the rotor is provided with a plurality of elongate, circumferentially spaced, radially extending, axially spaced pairs of channels 42. The channels 42 are arranged adjacent and are fixed to the inner opposing surfaces of the discs or plates 41.

The base portions of the channels 42 are arranged in bearing engagement on the plates so that the channels open laterally inwardly, as clearly illustrated in the drawings.

In practice, the shaft 40 and the channels carried thereby are the essential elements of the rotor and as such the rotor may be likened to and termed a "starwheel type rotor."

The discs or plates 41, illustrated in the drawings, show but one of several effective and structurally sound manners in which the channels can be advantageously mounted and supported on or from the shaft 40.

The drive means G for the rotor F includes a prime mover P mounted on one side wall of the cabinet by means of a suitable bracket 45 and driving a drive sprocket 46. The prime mover P can, as illustrated, involve an electric motor 47 with a gear reduction box 48.

The means G further includes a driven sprocket 49 on the adjacent end of the shaft 40, outboard of the cabinet A and a drive chain 50 engaged about and between the sprockets.

The drive means G is adapted to drive the rotor F, continuously, at a low rate. For example, the means G drives the rotor at one revolution per minute.

The several racks H that we provide are alike and each includes a pair of flat, rectangular, sheet metal frames 55 substantially equal in longitudinal extent with the distance between the bottoms of each related pair of channels 42 and slightly less in lateral extent than the radial extent from the periphery of the shaft to the outer ends of the channels 42.

The frames 55 of each rack are hinged together along one side edge by a suitable hinge structure 56 and are shiftable from a normal position, where they occur in side-by-side relationship, as illustrated in FIG. 3 of the drawings, to an open position, such as shown in FIG. 4 of the drawings.

The longitudinal and lateral members of the frame 55 are inwardly opening, U-shaped, sheet metal channel sections. Each frame is provided with a metal fabric sheet 57, the edge portions of which are engaged in and held tight by the channel members of the frame.

It will be apparent that the frames and screening material or metal fabric cooperate to define what are, in effect, perforate panels, pivotally connected together and between which foodstuff, such as meat, can be arranged and held secure. The racks H are adapted to be slidably engaged into and between related pairs of channels 42 of the rotor F. In practice, the racks are slidably engaged in their related pair of channels from the outer ends of the channels and are shifted radially inwardly relative to the rotor F and into stopped engagement with the shaft 40 of the rotor, as clearly illustrated in FIG. 3 of the drawings. The racks are engageable in and with the rotor F through the access opening 15 in the front wall 10 of the cabinet A. In practice, the door or closure 16 for the opening 15 is hinged along its lower or bottom edge to swing outwardly and to stop in a horizontal plane, as illustrated in FIG. 1 of the drawings. It will be apparent that with the door 16 disposed in the manner set forth above, the door establishes a suitable shelf on which racks can be supported, preparatory to sliding them into the cabinet and into engagement with the rotor.

The door 16, when open, as set forth above, also provides a suitable support for the racks, when they are removed from the rotor and from within the cabinet.

The outer ends of the inwardly projecting flanges of the channels 42 are provided with pin-receiving apertures 60, which apertures occur radially outward from the outer edges of the rack and into and through which suitable retaining pins 61 are releasably engaged. The pins 61 serve to retain the racks engaged in the channels and prevent said racks from falling or sliding out of engagement in the channels when the racks, during their travel in the cabinet, occur at the lower side of the rotor.

In practice, the retaining pins can be substituted with any suitable form of retaining or keeper means, without departing from the spirit of this invention.

It will be apparent that the duct 30 with its discharge opening or slot 31 occurs directly below and is in alignment with the rotor F. Further, it will be apparent that smoke and heat introduced into the chamber B of the cabinet A is initially directed upwardly between adjacent sets of racks, as the rotor is rotated.

It is to be noted that the rotor rotates at a very low rate of speed and, as a result, the heat and smoke issuing from the duct 30 has ample time to find its way upwardly between adjacent racks and uniformly distribute itself.

It will be apparent that by controlling the supply of gas and the flame in the heat generating means C and by controlling the damper 18 in the stack 17 and the damper 25 in the discharge duct 24, the heat and the amount of smoke in the smoke-house can be easily and accurately controlled.

It will be further apparent that with the construction that we provide, the access opening 15 can be made of limited vertical extent so that when the door 16 is open, little heat and smoke are allowed to escape from within the cabinet. This is a great improvement and great advantage over conventional smoke-houses having vertically spaced meat racks and which must be fully opened for the purpose of loading or unloading.

Having described only a typical preferred form and application of our invention, we do not wish to be limited to the specific details herein set forth, but wish to reserve to ourselves any modifications or variations that may appear to those skilled in the art and which fall within the scope of the following claims.

Having described our invention, we claim:

1. A smoke-house including, a cabinet defining a closed chamber and having top, bottom, front, rear, and side walls; an access opening extending transverse the front wall; a closure shiftably carried by the front wall and normally overlying the opening, and an exhaust stack communicating with the upper portion of the chamber, an elongate rotor arranged within the chamber and extending laterally of the cabinet, said rotor having a plurality of circumferentially spaced, radially outwardly projecting pairs of elongate, axially spaced rack supporting channels, bearing means at the sides of the cabinet rotatably supporting the rotor, drive means at one side of the cabinet and driving the rotor, a rack for each pair of channels including, a pair of flat, perforate, rectangular, foodstuff-engaging panels normally juxtapositioned and corresponding in longitudinal extent with the lateral extent between the related channels and slidably engageable therewith; heat generating means related to the cabinet to heat the chamber defined thereby and smoke generating means related to the cabinet to fill the chamber with smoke.

2. A structure as set forth in claim 1 including retaining means at the ends of the channels to releasably retain and prevent radial outward shifting of the racks when the rotor is rotated.

3. A structure as set forth in claim 1 wherein, the panels of the racks are pivotally connected at one side thereof.

4. A structure as set forth in claim 1 wherein, the panels of the racks are pivotally connected at one side thereof, and retaining means at the bottom of the ends of the channels to releasably retain and prevent radial outward shifting of the racks when the rotor is rotated.

5. A structure as set forth in claim 1 wherein, said panels of each rack include rectangular metal frames and wire screen within and carried by the frames, said frames being pivotally connected at one side of the racks.

6. A structure as set forth in claim 1 wherein, said heat generating means includes a furnace remote from the cabinet, a delivery duct extending from the furnace to the cabinet and a discharge duct extending from the delivery duct into the chamber below and longitudinally of the rotor.

7. A structure as set forth in claim 1 wherein, said heat generating means includes a furnace remote from the cabinet, a delivery duct extending from the furnace to the cabinet and a discharge duct extending from the delivery duct into the chamber below and longitudinally of the rotor, said channels on the rotor having retaining means to releasably retain the racks in engagement therewith when the rotor is rotated.

8. A structure as set forth in claim 1 wherein, said heat generating means includes a furnace remote from the cabinet, a delivery duct extending from the furnace to the cabinet and a discharge duct extending from the delivery duct into the chamber below and longitudinally of the rotor, said channels on the rotor having retaining means to releasably retain the racks in engagement therewith when the rotor is rotated, said panels of each rack include rectangular metal frames and wire screen within and carried by the frames, said frames being pivotally connected at one side of the racks.

9. A structure as set forth in claim 1 wherein, said heat generating means includes a furnace remote from the cabinet, a delivery duct extending from the furnace to the cabinet and a discharge duct extending from the delivery duct into the chamber below and longitudinally of the rotor, said smoke generating means including, a fire box remote from the cabinet and furnace and having a fuel supporting tray, an outlet duct to conduct smoke from the fire box, a nozzle of lesser diameter than the delivery duct extending from the outlet duct and entering the delivery duct with its discharge end disposed in the direction of flow through said delivery duct.

10. A structure as set forth in claim 1 wherein, said heat generating means includes a furnace remote from the cabinet, a delivery duct extending from the furnace to the cabinet and a discharge duct extending from the delivery duct into the chamber below and longitudinally of the rotor, said smoke generating means including a fire box remote from the cabinet and furnace and having a fuel supporting tray, an outlet duct to conduct smoke from the fire box, a nozzle of lesser diameter than the delivery duct extending from the outlet duct and entering the delivery duct with its discharge end disposed in the direction of flow through said delivery duct, and damper means in the exhaust stack and the outlet duct.

References Cited by the Examiner
UNITED STATES PATENTS

| | | |
|---|---|---|
| 317,431 | 5/1885 | Allen. |
| 2,262,910 | 11/1941 | Aller. |
| 2,760,428 | 8/1956 | Boyajian _____ 99—402 X |
| 2,789,877 | 4/1957 | Pfundt _____ 99—229 X |
| 2,790,380 | 4/1957 | Shryack _____ 99—427 X |
| 3,220,336 | 11/1965 | Hoover _____ 99—402 X |

WALTER A. SCHEEL, *Primary Examiner.*

J. M. NEARY, *Assistant Examiner.*

UNITED STATES PATENT OFFICE
CERTIFICATE OF CORRECTION

Patent No. 3,316,831                                         May 2, 1967

Don H. Koland et al.

It is hereby certified that error appears in the above numbered patent requiring correction and that the said Letters Patent should read as corrected below.

In the heading to the printed specification, line 5, for "Robert S. Bardins" read -- Robert S. Bardin --.

Signed and sealed this 6th day of August 1968.

(SEAL)
Attest:

Edward M. Fletcher, Jr.                                EDWARD J. BRENNER
Attesting Officer                                         Commissioner of Patents